United States Patent [19]

Gaeth

[11] 3,725,379

[45] Apr. 3, 1973

[54] CATALYST COMPOSITION AND PROCESS OF POLYMERIZING ETHYLENE WITH SAME

[75] Inventor: Rudolf H. Gaeth, Bartlesville, Okla.

[73] Assignee: Phillips Petroleum Company, Bartlesville, Okla.

[22] Filed: Mar. 18, 1971

[21] Appl. No.: 125,849

Related U.S. Application Data

[63] Continuation of Ser. No. 755,808, Aug. 28, 1968, abandoned.

[52] U.S. Cl..........260/94.9 E, 252/429 C, 252/431 R
[51] Int. Cl.............................C08f 1/56, C08f 13/04
[58] Field of Search ..252/429, 431 R, 431 N, 431 D, 252/431 C; 260/94.9 E

[56] References Cited

UNITED STATES PATENTS

| | | | |
|---|---|---|---|
| 3,485,881 | 12/1969 | Zuech | 260/666 |
| 3,558,518 | 1/1971 | Zuech | 252/429 |
| 2,953,552 | 9/1960 | Stampa et al. | 260/94.9 |
| 3,304,292 | 1/1967 | Hagemeyer et al. | 260/94.9 |

*Primary Examiner*—James A. Seidleck
*Assistant Examiner*—Edward J. Smith
*Attorney*—Young & Quigg

[57] ABSTRACT

A rubbery polymer having properties of ethylene/propylene rubber is produced by contacting ethylene with a catalyst comprising (1) a nickel-containing compound; (2) an organoaluminum halide; and (3) a complex molybdenum compound.

3 Claims, No Drawings

CATALYST COMPOSITION AND PROCESS OF POLYMERIZING ETHYLENE WITH SAME

This application is a continuation of Ser. No. 755,808, filed Aug. 28, 1968, now abandoned.

This invention relates to the preparation of rubbery polymer. In one aspect this invention relates to the production of rubbery polymer from ethylene. In still another aspect this invention relates to a catalyst which is active for converting ethylene into rubbery polymer.

In the production of ethylene/propylene rubber, a vanadium, niobium, or titanium compound has generally been regarded as an essential component in the catalyst system. Vanadium and titanium halides and oxyhalides are well-known prior art catalyst components.

It is an object of the present invention to provide a novel catalyst for producing a rubbery polymer having properties of ethylene/propylene rubber. Another object of this invention is to provide a method for producing a rubbery polymer having properties of ethylene/propylene rubber from ethylene. The provision of a novel catalyst composition is still another object of this invention. Other objects, aspects and advantages of the invention will be apparent to one skilled in the art upon studying the disclosure including the detailed description of the invention.

Broadly the invention contemplates the preparation of a rubbery polymer having properties of ethylene/propylene rubber from ethylene by contacting the ethylene with a catalyst system comprising (1) a nickel-containing compound; (2) an organoaluminum halide; and (3) a complex molybdenum compound having the formula: $L_a(Mo(NO)_b X_c$ wherein L is a ligand; and X is halogen, CN, SCN, OCN, $SnCl_3$ or a carboxylic acid radical; $a$ is 0–3, $b$ is 1–2 and $c$ is 0–5, and the number of $a$, $b$ and $c$ groups present in the complex is not greater than the number required for the Mo to achieve the closed shell electronic configuration of the next higher atomic number inert gas.

Some ligands (L) which can be present in the molybdenum complex component ($a$) of the present invention include those represented by the formulas:

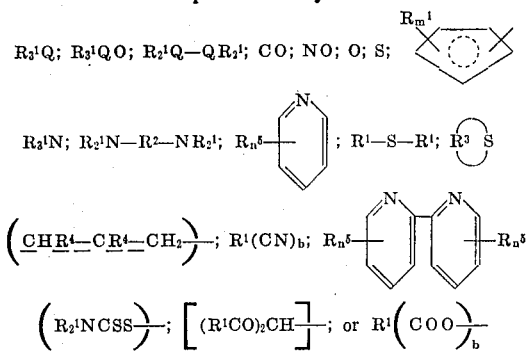

wherein each $R^1$ is an aromatic or saturated aliphatic hydrocarbon radical, including alkoxy and halo derivatives thereof, having up to 20 carbon atoms; Q is one of phosphorus, antimony, or arsenic; $R^2$ is a divalent aromatic or saturated aliphatic hydrocarbon radical having up to 20 carbon atoms; $R^3$ is a saturated or ethylenically unsaturated divalent hydrocarbon radical having three to 10 carbon atoms; each $R^4$ is hydrogen or a methyl radical; each $R^5$ is an aromatic, saturated aliphatic, or ethylenically unsaturated aliphatic hydrocarbon radical, having up to 30 carbon atoms; $n$ is 0, 1, 2 or 3; and $m$ is 0, 1, 2, 3, 4 or 5.

Some examples of specific molybdenum complex compounds include: $(triphenylphosphine)_2 Mo(NO)_2Cl_2$, $Mo(NO)_2Cl_2$, $(pyridine)_2Mo(NO)_2Cl_2$, $(stearate)_2$-$Mo(NO)_2Cl_2$, $(benzoate)_2 Mo(NO)_2Cl_2$, NO-treated $(butyronitrile))_2 MoCl_4$, NO-treated cyclopentadienyl)$MO(CO)_3$, NO-treated $(stearate)_2 MoCl_3$, NO-treated pyridine-treated $MoCl_5$, NO-treated $(benzoate)_2 MoCl_3$, NO-treated $(acetylacetonate)_2 MoO_2$, NO-treated $MoOCl_3$, NO-treated tetrallyltin-treated $MoCl_5$, NO-treated $MoCl_5$, NO-treated $MoCl_2$, NO-treated tributylphosphine-treated $MoCl_5$, NOCl-treated $MoO_2$, NOCl-treated pyridine-treated $MoO_2$, NO-treated $MoO_2$, and NO-treated $Mo(acetate)_2$.

The nickel-containing catalyst component can be compounds such as nickel salts of inorganic or organic acids, nickel salts of beta-diketones, or organo-nickel complexes such as those having the formula: $(R_3PO)_2 NiX_2$,

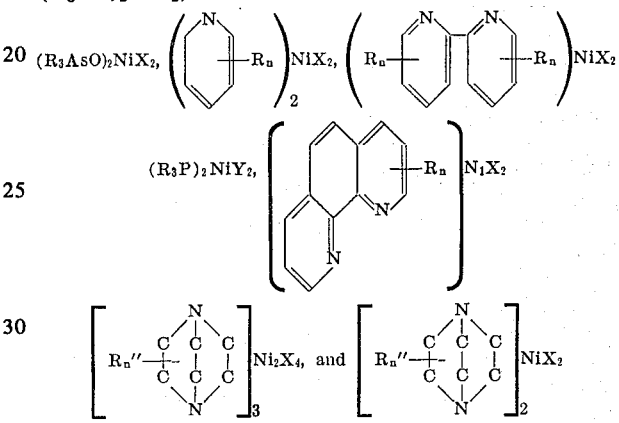

wherein R is an alkyl, alkenyl, cycloalkyl, cycloalkenyl or aromatic radical or combination thereof containing from one to about 20 carbon atoms, Y is a hydrocarbon radical, R, or halogen and at least one Y is a halogen, X is a halogen, $n$ is an integer of 0 to 4 and R'' is one of methyl or ethyl.

Some examples of suitable nickel halide complexes which can be used as the first component of the catalyst system are: bis(triphenylphosphine)-dichloronickel, bis(tributylphosphine)dibromonickel, bis(tricyclopentylphosphine)diiodonickel, bis(tribenzylphosphine)dichloronickel, bis[tri(4-tolyl)-phosphine]dibromonickel, bis(triisobutylphosphine)allylnickel chloride, bis-(trimethylphosphine)methylnickel bromide, bis[tri(2-naphthyl)phosphine]-benzylnickel iodide, bis[tri(2-ethylhexyl)phosphine]phenylnickel chloride, bis(tricrotylphosphine)cyclohexylnickel bromide, bis(trieicosylphosphine)dichloronickel, and the like and mixtures thereof. In the above-mentioned specific phosphine compounds the term "phosphine" can be deleted and any one of the terms "phosphine oxide," and "arsine oxide" can be substituted therefor to obtain other suitable specific compounds for this invention. For example, bis(triphenylphosphine)dichloronickel can also be bis(triphenylphosphine oxide)-dichloronickel, or bis(triphenylarsine oxide)dichloronickel, and so on with the other specific compounds mentioned. Therefore, for the sake of brevity, additional specific compounds containing phosphorus or arsenic will not be listed here. Other suitable specific compounds include bis(pyridine)dichloronickel, (2,2'-bipyridine)dibromonickel, (4,5-phenanthroline)diiodonickel, and a complex of triethylenediamine and nickel dihalide which, in the case of the chlorine species, can be termed tris(triethylenediamine)tetrachlorodinickel.

The bis(trihydrocarbylphosphine)dihalonickel compounds are known in the art and can be prepared by any conventional technique, generally by combining a nickel dihalide with a trihydrocarbyl phosphine in a suitable solvent. To prepare the hydrocarbon-substituted variation of the above catalyst, one mole of the above dihalonickel complex is treated with 1 or 2 moles of a hydrocarbyl-magnesium halide or its equivalent in a hydrocarbylalkali metal compound, a hydrocarbylalkaline earth metal compound, or a hydrocarbylaluminum compound. The contact can take place at −30 to about 100° C. for a period of from a few minutes to several hours in any convenient solvent in which the reagents are at least partially soluble, ethers being preferred. The solid can be isolated by conventional crystallization techniques or can be utilized after simple evaporation of the ether.

The phosphine oxide and arsine oxide compounds are known in the art and can be prepared in accordance with the process disclosed by Cotton and Goodgame in *The Journal of the American Chemical Society*, Vol. 82, page 5771, 1960.

Organoaluminum halides employed in the catalyst systems of this invention include organoaluminum monohalides, dihalides, and mixtures, e.g., organoaluminum sesquihalides.

Some examples of the organoaluminum halides useful in this catalyst system include: methylaluminum dichloride, dimethylaluminum chloride, diethylaluminum bromide, ethylaluminum dibromide, vinylaluminum diiodide, dibutylaluminum chloride, phenylaluminum dibromide, dibenzylaluminum chloride, 4-tolylaluminum dichloride, dodecylaluminum dibromide, eicosylaluminum dichloride, butylaluminum dichloride, and mixtures thereof including methyl-aluminum sesquichloride, ethylaluminum sesquichloride, and the like. Presently preferred aluminum compounds are those containing radicals of the lower molecular weight hydrocarbons, such as methyl and ethyl.

The ratio of catalyst components will vary depending upon the compounds employed and the type of product desired. In general, the mole ratio of organoaluminum halide to nickel compound is in the range of 1:1 to 20:1, preferably 3:1 to 15:1, and the mole ratio of organoaluminum halide to the molybdenum compound is in the range of 0.1:1 to 20:1, preferably 0.5:1 to 15:1.

The process is conducted either in the presence of a diluent or absence of diluent. Paraffins, cycloparaffins, and aromatic hydrocarbons containing from four to 10 carbon atoms per molecule are suitable diluents.

The present process can be conducted over a broad temperature range, for example about −80° to 250°C. The temperature will generally be in the range of −50° to 150° C., preferably in the range of 0° to 75° C. The time is dependent upon the temperature as well as upon the catalyst, for example in the range of about 0.1 minute to 100 hours, and is generally in the range of one to 100 hours. The pressure usually is up to about 200 psi.

EXAMPLE

A reactor was charged with 0.2 gram (0.3 mmole) of bis(triphenylphosphine)dichloronickel, 3.0 millimoles of methylaluminum sesquichloride, and 500 milliliters of cyclohexane. The reactor was then pressured to 25 psig with ethylene and the mixture was held at room temperature for 1 hour. One millimole (based on molybdenum content) of the reaction product of molybdenum trichloride distearate with NO was then added and the reactor was pressured to 500 psig with ethylene. The temperature was maintained at 70° C. for about 16 hours (overnight). A gas chromatographic analysis showed a small amount of propylene in the gas phase. A polymeric product insoluble in cyclohexane was formed. The reaction mixture was poured into isopropyl alcohol, and the polymer separated, and dried. A rubbery polymer having properties of ethylene/-propylene rubber was formed.

The molybdenum trichloride distearate employed as a catalyst component was prepared by reacting stearic acid with molybdenum pentachloride in cyclohexane. The recipe was as follows:

| | |
|---|---|
| Cyclohexane, ml | 500 |
| Stearic acid, grams | 100 (0.35 mole) |
| Molybdenum pentachloride, grams | 50 (0.18 mole) |

The materials were charged to the reactor which was then purged with nitrogen for 10 minutes. The temperature was adjusted to 50° C. and maintained at this level for 15 hours. The reactor was then vented and purged with nitrogen for 15 minutes. The molybdenum trichloride distearate was soluble in cyclohexane. A vessel containing the molybdenum trichloride distearate was pressured to 30 psig with NO for approximately one hour at room temperature (about 75° F.) to obtain the reaction product used for the molybdenum complex component in the catalyst system.

It is surprising that a rubbery polymer having properties of ethylene/propylene rubber can be prepared in the absence of a vanadium or titanium compound in view of the teachings of the prior art; and, furthermore, it is surprising that such a rubbery polymer can be prepared from a single olefinic material, in other words ethylene.

What is claimed is:

1. As a composition of matter, a catalyst which forms on admixture of
    1. bis(triphenylphosphine)dichloronickel;
    2. methylaluminum sesquichloride;
    3. the reaction product of molybdenum trichloride distearate with NO;
    wherein the mol ratio of the methylaluminum sesquichloride to the bis(triphenylphosphine)dichloronickel is in the range of 1:1 to 20:1 and the mol ratio of methylaluminum sesquichloride to the reaction product of molybdenum trichloride distearate with NO is in the range of 0.1:1 to 20:1.

2. A process for producing a rubbery polymer having properties of an ethylene/propylene rubber which process comprises contacting ethylene at a temperature in the range of about −80 to 250°C., contact time in the range of about 0.1 minute to 100 hours and pressure up to about 2,000 psi with:
    1. as a nickel containing dimerization catalyst bis(triphenylphosphine)dichloronickel;
    2. methylaluminum sesquichloride;
    3. the reaction product of molybdenum trichloride distearate with NO; wherein the mol ratio of the methylaluminum sesquichloride to the nickel containing dimerization catalyst is in the range of 1:1 to 20:1 and the mol ratio of methylaluminum sesquichloride to the reaction product of molybdenum trichloride distearate with NO is in the range of 0.1:1 to 20:1; and wherein the ethylene, the nickel-containing dimerization catalyst and the methylaluminum sesquichloride are contacted and the reaction product of molybdenum trichloride distearate with NO is added to the resulting reaction mixture.

3. The process according to claim 2 wherein the temperature is about 70°C., the pressure about 500 psig, and the reaction time about 16 hours.

* * * * *